United States Patent

Ando et al.

[15] 3,643,566

[45] Feb. 22, 1972

[54] UNDERWATER CASE FOR CAMERAS

[72] Inventors: Sadanao Ando, Musashino-shi, Tokyo; Nobuki Matsumoto, Yokohama-shi, both of Japan

[73] Assignee: Kabushiki Kaisha Ricoh, Tokyo, Japan

[22] Filed: Sept. 19, 1969

[21] Appl. No.: 859,498

[30] Foreign Application Priority Data

Sept. 27, 1968 Japan....................................43/84592

[52] U.S. Cl. ..............................................................95/11 W

[51] Int. Cl.........................................................G03b 17/08

[58] Field of Search .........................317/351; 190/12, 35, 51; 206/46; 217/18; 220/21; 95/281, 11 W

[56] References Cited

UNITED STATES PATENTS

| | | | |
|---|---|---|---|
| 2,865,271 | 12/1958 | Klein | 95/11 W |
| 2,901,143 | 8/1959 | Pope | 95/11 W |

*Primary Examiner*—John M. Horan
*Assistant Examiner*—Kenneth C. Hutchison
*Attorney*—Burgess, Ryan and Hicks

[57] ABSTRACT

An underwater case for cameras whose specific gravity when housing a camera is less than unity and which has support members for supporting the camera within the case so as to deviate the center of gravity of the camera from that of the case toward the front face thereof. The case has a rear surface which is colored with a color which can readily distinguish the case in the water. Ordinary cameras can be used for underwater photography and the case housing the camera floats and can be readily recognized under water.

3 Claims, 2 Drawing Figures

UNDERWATER CASE FOR CAMERAS

BACKGROUND OF THE INVENTION

The present invention relates to a case for cameras and more particularly to an underwater case for housing ordinary tape cameras for underwater photography.

The conventional underwater camera has special means to provide watertightness so that the construction of the underwater camera is complicated and the underwater cameras are generally expensive. Furthermore, the operation of the underwater camera is generally difficult.

One of the objects of the present invention is to enable an ordinary camera to be used under water.

Another object of the present invention is to provide an underwater case for housing therein ordinary cameras for underwater photography, which case is simple in construction and inexpensive to manufacture.

A further object of the present invention is to provide an underwater case for cameras which will not sink to the bottom but will float in the water even when an operator lets go his hold of the case, and which can be readily recognized even under water.

SUMMARY OF THE INVENTION

According to the present invention, an underwater case for housing an ordinary camera for underwater photography has a sufficient volume to house therein the camera and is so constructed that the specific gravity of the underwater case housing the camera becomes less than unity. Therefore, even when the underwater case is dropped under water, it may readily float so that the camera will never be lost in water.

The underwater case of the present invention is further so constructed that the center of gravity of the case is deviated toward the front face thereof when the camera is housed therein so that when the case is dropped in water it floats with its rear or back face directed upwardly. Since the rear face is colored with a color which can be readily distinguished in water, the case will never be lost.

In order to deviate the center of gravity as described above, there are provided support members which conform to the dimensions of the camera to be housed and to hold it in position.

As described hereinabove, the rear face of the underwater case is colored with a color such as yellow which can be readily distinguished from the water, and if desired a fluorescent paint or pigment may be used.

The above and other objects, features and advantages of the present invention will become more apparent from the description of one illustrative embodiment thereof with reference to the accompanying drawing.

DESCRIPTION OF THE PREFERRED EMBODIMENT

Figure 1:
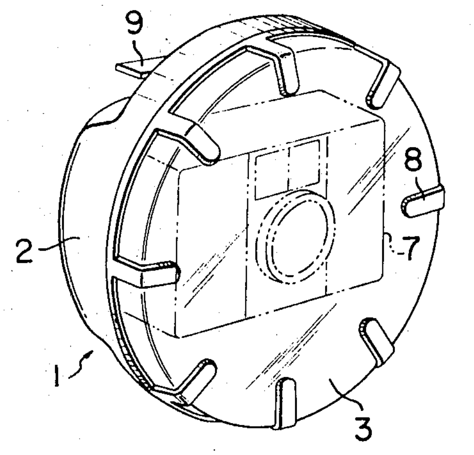
FIG. 1 is a perspective view of one embodiment of an underwater case for cameras according to the present invention.
Figure 2:
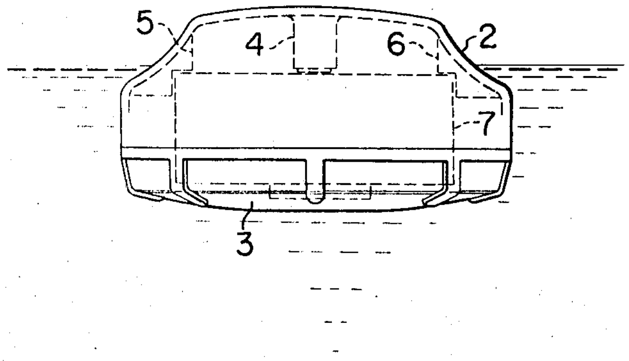
FIG. 2 is a perspective view illustrating the case floating in the water.

Referring to FIG. 1, an underwater case 1 for cameras of the present invention comprises a case body 2 and a transparent front cover 3 which are screwed with each other to provide a watertight sealing therebetween. Inside the case body 2, there are provided supports 4, 5 and 6 indicated by the dotted lines in Fig. 2 so that a camera 7 may be supported by them with its lens being directed toward the front cover 3. The above supports 4, 5 and 6 are so arranged that the center of gravity of the camera case together with the camera 7 is biased toward the front face of the case 1. The rear surface of the case 1 is colored with a color such as yellow which can be readily distinguished from that of the water. The case 1 housing the camera 7 therein can readily float in the water with the coloring back surface directed upwardly since the center of gravity is displaced toward the front cover as described above and can be readily found out even among the waves since the back surface is colored.

Reference numeral 8 designates a plurality of clamplike members for facilitating the attachment of the front cover 3 to the case body 2, and 9 designates shutter release member which is attached to the case body 1 and is adapted to release the shutter of the camera 7. The front cover 3 may be attached to the case body 2 in any suitable manner as long as the watertight sealing therebetween is ensured.

We claim:

1. An underwater case for cameras comprising
- a rear case body having a predetermined depth;
- a front case body having a matching correspondence with said rear case body, said front and rear case bodies being fastenable together in watertight arrangement, said front case body having a depth less than that of said predetermined depth of said rear case body;
- said front case body having a front transparent cover;
- said rear case body having an opaque outer surface throughout provided with a distinguishing color;
- said rear case body having a plurality of supports mounted on its inside surface and projecting therefrom toward said front cover, said supports having a configuration and arrangement allowing a camera to be selectively insertable to be in abutting relation with supports with its lens directed toward said front cover, part of said camera located within said rear case body and part of said camera located within said front case body;
- said supports projecting toward said front cover for a predetermined distance to provide a camera position such that the center of gravity of said underwater case is located closer to said front cover than said rear surface; and
- said underwater case having a specific gravity less than unity.

2. An underwater case according to claim 1 in which said supports are three in number comprising a pair of side supports for edges of the camera and a center support extending forward to locate the camera and the center of gravity toward said front cover.

3. An underwater case according to claim 1 in which said rear case body and said front case body are fastened together by screwable means, and clamping means are provided for additional attachment of said rear case body and said front case body.

* * * * *

UNITED STATES PATENT OFFICE
CERTIFICATE OF CORRECTION

Patent No. 3,643,566 Dated February 22, 1972

Inventor(s) Sadanao Ando et al.

It is certified that error appears in the above-identified patent and that said Letters Patent are hereby corrected as shown below:

On the cover sheet, cancel the illustrative drawing and insert the drawing shown below:

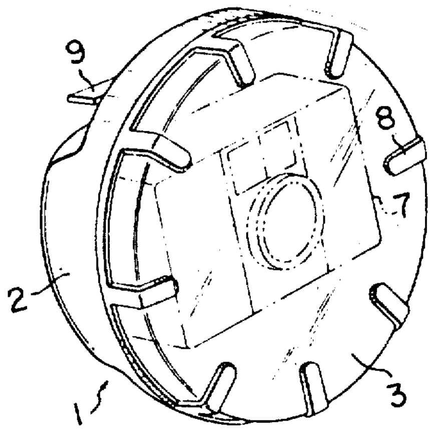

Signed and sealed this 22nd day of August 1972.

(SEAL)
Attest:

EDWARD M.FLETCHER,JR.
Attesting Officer

ROBERT GOTTSCHALK
Commissioner of Patents